Dec. 2, 1947.  C. A. MANN  2,431,817
FLUID DISPLACEMENT DEVICE OF THE GEAR TYPE
Filed April 22, 1944   2 Sheets-Sheet 1

INVENTOR.
CECIL A. MANN
BY
attorney.

Dec. 2, 1947.  C. A. MANN  2,431,817
FLUID DISPLACEMENT DEVICE OF THE GEAR TYPE
Filed April 22, 1944  2 Sheets-Sheet 2
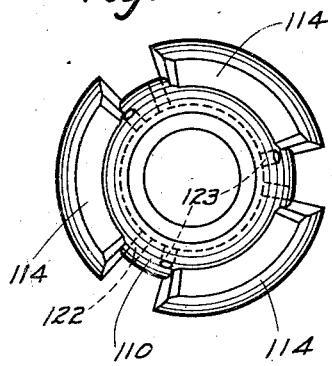
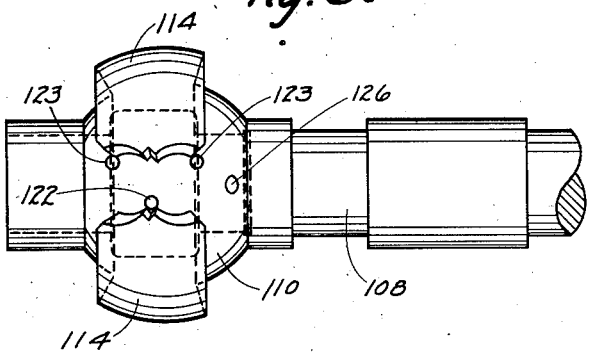
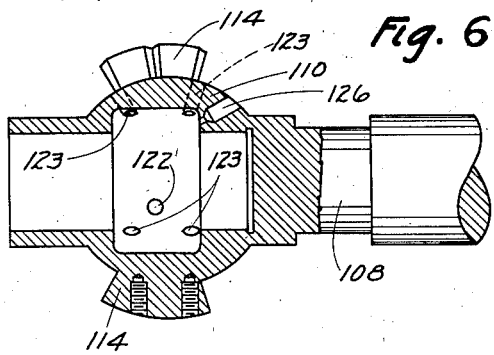
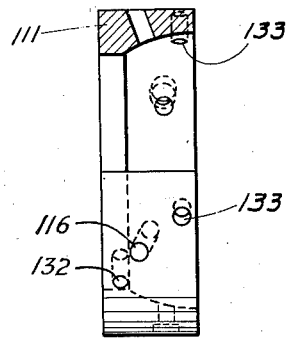
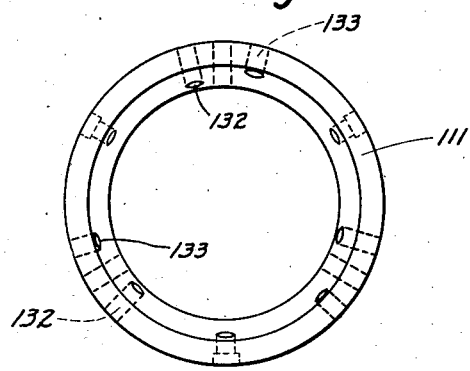
INVENTOR.
CECIL A. MANN
BY Patented Dec. 2, 1947

2,431,817

UNITED STATES PATENT OFFICE 2,431,817

FLUID DISPLACEMENT DEVICE OF THE GEAR TYPE

Cecil A. Mann, Dayton, Ohio, assignor to H. Christa Smith, Cincinnati, Ohio

Application April 22, 1944, Serial No. 532,319

7 Claims. (Cl. 121—70)

This invention relates to fluid displacement devices of the gear type and more particularly to fluid operated motors and pumps.

One object of the invention is to provide such a fluid displacement device which has substantially perfect hydraulic balance, and to provide such balance without resorting to mechanism or conduits provided solely for the purpose of balance.

A further object of the invention is to provide such a fluid displacement device having an efficiency greatly in excess of the efficiency of ordinary gear displacement devices.

A further object of the invention is to provide such a device in which both balance and increased efficiency are secured by a combination of intermeshing gears.

A further object of the invention is to provide such a device in which each individual gear is subjected to substantially balanced peripheral pressure.

A further object of the invention is to provide a hydraulically balanced and highly efficient fluid operated motor having differential power outputs.

Other objects of the invention may appear as the device is described in detail.

Figure 1:
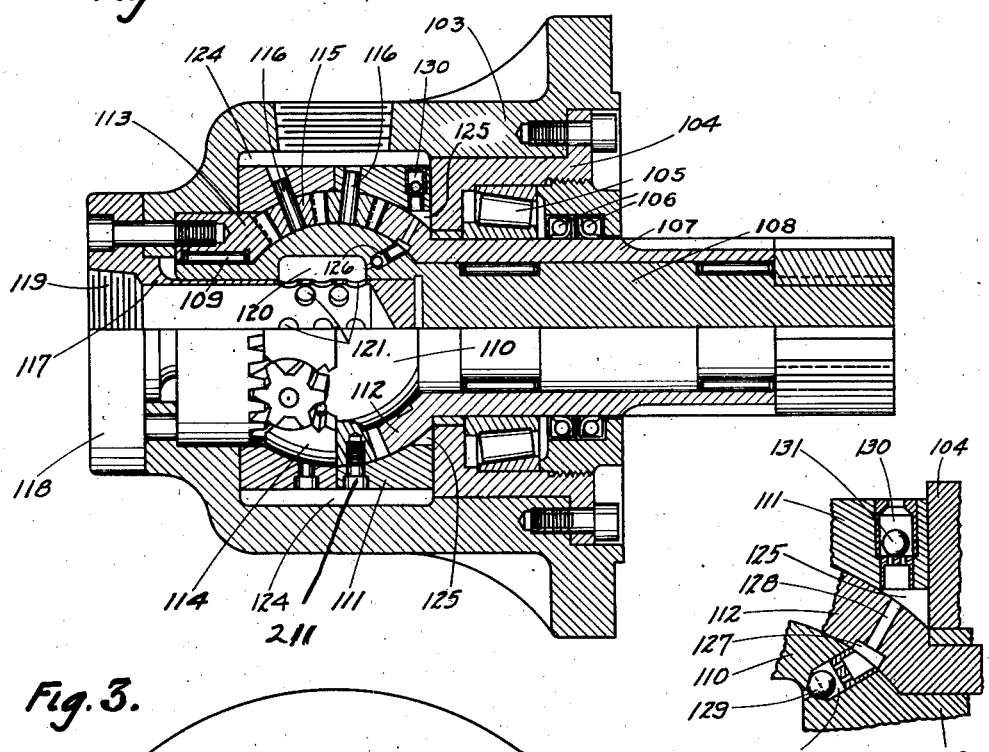
Figure 2:
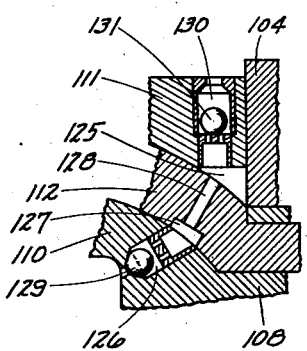
Figure 3:
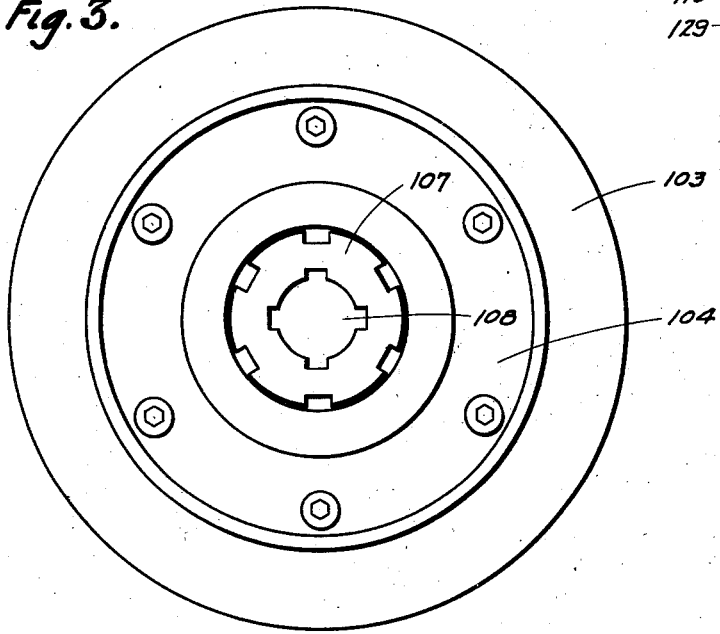

In the accompanying drawings Fig. 1 is a longitudinal section of one form of the device showing the internal mechanism partly in elevation and partly in section; Fig. 2 is an enlarged sectional detail of a part of Fig. 1; Fig. 3 is a front elevation of the device of Fig. 1; Fig. 4 is an end view of the main shaft and spider of the device of Fig. 1; Fig. 5 is a side elevation of said shaft and spider; Fig. 6 is a sectional view of the tubular end of the shaft and spider; Fig. 7 is an elevation, partly in section, of one part of the outer wall of the work chamber; and Fig. 8 is an end elevation of said part of the wall of the work chamber.

In these drawings I have illustrated one embodiment of the invention, which is designed primarily as a motor but which, with or without minor alterations, may be operated as a pump. It is to be understood, however, that devices embodying the invention may take various forms, and that the word "motor" is herein used as a descriptive term and not as a limitation.

Preferably the invention comprises a combination of interlocking gears, of any suitable type or types, mounted in a casing and so arranged with relation one to the other and to the fluid passages that each gear will be subjected to substantially balanced peripheral pressure. In the illustrated embodiment the combination of gears includes two opposed gears mounted on a common axis and at least one of which is rotatable about said axis and constitutes a power transmission element adapted to be connected with exterior devices to be operated or with an exterior source of power. Mounted between said opposed gears are intermediate gears which mesh with the respective opposed gears and are so arranged with relation to fluid passages that the fluid will be in operative contact with the teeth of each of said intermediate gears at a plurality of points so spaced about the same that the gear will be subjected to substantially balanced peripheral pressure. The device is operative with a single group of intermediate gears meshing one with the other and with the respective opposed gears, but in order that the opposed gears, as well as the intermediate gears, may be subjected to properly balanced peripheral pressures there is provided a plurality of groups of intermediate gears which have geared connections with each of the opposed gears at points spaced substantially equal distances one from the other about the toothed peripheries of said opposed gears.

Supported within the casing which encloses the combination of gears are elements so arranged with relation to the respective intermediate gears as to form about the periphery of each of the latter a plurality of passages or channels through which the fluid flows in operative engagement with the teeth thereof. Thus when the device operates as a motor the fluid under pressure acts on each intermediate gear at points so spaced about the latter that it is subjected to a substantially balanced peripheral pressure, and the several intermediate gears transmit pressure to the opposed gears at points so spaced about the latter that each of the opposed gears is subjected to substantially balanced peripheral pressure, thereby maintaining the motor as a whole in substantially perfect hydraulic balance at all speeds of operation. When the device is operated as a pump the power applied to that one of the opposed gears which functions as a power transmission element is transmitted to the intermediate gears at points spaced about said power transmitting gear as aforesaid, and each intermediate gear acts on the fluid at points spaced about said intermediate gear, and the other of said opposed gears meshes at peripherally spaced points with the respective intermediate gears, thereby maintaining the motor in substantially perfect hydraulic balance at all speeds of operation. The illustrated embodiment of the invention will be described as a motor with the understanding that it is not limited to such use.

In the drawings the device is shown as a differential motor which utilizes bevel gears in a spherical work chamber. As there shown, the mechanism is mounted in a substantially cylindrical casing 103 one end of which is closed by an annular structure including an internal collar 104, a bearing 105 and oil seals 106. Mounted in the bearing 105 is a tubular element or shaft 107 and mounted in the tubular shaft 107 for rotation with relation thereto is an inner or main shaft 108 which extends through the casing and is rotatably mounted at its other end in a bearing 109. The shaft 108 is provided within the casing with an enlarged portion 110, preferably formed integral therewith, of substantially spherical contour which forms the inner wall of a work chamber, the outer wall of which is formed by an annular structure 111 having an inner surface conforming to a section of a sphere described about the same center as the spherical surface of the enlarged portion of the shaft and spaced therefrom. For convenience of manufacture this annular structure 111 is formed in two parts which are rotatably supported in the casing in running contact with the inner end of the collar 104 and opposed end wall of the casing. Mounted within the spherical work chamber are two bevel gears 112 and 113 arranged in opposed relation one to the other, the gear 112 being connected with and in the present instance formed integral with the tubular shaft 107, and the gear 113 being rigidly secured to the casing in a position concentric with the axis of the shaft 108, the bearing 109 for that shaft being carried by this fixed gear. The enlarged or spherical portion 110 of the shaft 108 is provided between the opposed gears with a plurality of projections or elongate lugs 114 the outer surfaces of which conform to or are in sealed contact with the inner surface of the annular structure 111, the ends of adjacent lugs being spaced apart circumferentially to provide spaces in which intermediate gears may be mounted. In this instance a plurality of groups of intermediate gears are employed, the several groups being spaced apart substantially equal distances circumferentially of the shaft 108. Each group includes two bevel gears 115 rotatably mounted in the work chamber, meshing one with the other and meshing respectively with the fixed gear 113 and the rotatable gear 112. Each of the intermediate gears is rotatably supported on a pintle 116 having one end mounted in the annular member 111. The annular member 111 is connected with the shaft 108 so that the shaft, annular member and pinions rotate in unison about the axis of the shaft. The connection may be effected in any suitable manner, as by screws 211 extending through the respective parts of the annular member into the lugs 114.

Channels are formed on a plurality of sides of each of the intermediate gears 115 and inlet and outlet ports are arranged to cause fluid to flow through these channels. That end portion of the shaft 108 having the enlargement is provided with a longitudinal bore extending through the enlargement. Mounted in this bore is a tube 117 which is carried by and preferably formed integral with an annular end member 118 which is rigidly secured to the casing and provided with internal screw threads 119 to enable the same to be connected with a fluid conduit. The spherical enlargement of the shaft is provided about the tube 117 with a circumferential passage 120 with which the tube is connected by means of a plurality of openings 121. The inlet passage 120 is connected by suitable ports with the channels on the opposite sides of each of the intermediate gears. The gears being in the present instance arranged in pairs three inlet ports are provided for each pair of gears, see Figs. 5 and 6. The port 122 leads to a point between the gears at which the two gears move out of engagement one with the other and thus supplies fluid to the corresponding channels of both gears. Other ports 123 communicate with the channels on the opposite side of the gears adjacent the points at which the intermediate gears move out of engagement with the opposed gears 112 and 113, so that the fluid flows in the same circumferential direction through the channels for each gear and in different circumferential directions through the channels of the two gears. A similar arrangement of ports in the annular structure 111 connects the outlet ends of the respective channels with an outlet passage 124 formed between the annular structure and the wall of the casing. One part of the annular structure 111, the left hand part in Fig. 1, is shown in Figs. 7 and 8. This part of the structure is provided with an inlet port 132 for each pair of intermediate gears and each such port leads to the outlet passage from the point at which the corresponding left hand intermediate gear 115 moves in to mesh with the end gear 113, that is, at the discharge end of the channel at one side of the intermediate gear. This part of the structure is also provided with an outlet port 133 for each pair of intermediate gears, each such port leading to the outlet passage from the point at which the two intermediate gears move in to mesh one with the other, that is, from the inner ends of the channels which communicate with the inlet ports 123. The right hand part of the annular structure has outlet ports for the right hand intermediate gears in substantially the same arrangement as the ports 132 but in slightly different locations due to the difference in the number of teeth in the two end gears.

The opposed gears 112 and 113 are provided with different numbers of teeth, the rotatable gear 112 having, in the present instance, more teeth than the fixed gear 113. The gears of each pair of intermediate gears rotate in opposite directions and that intermediate gear which is in mesh with the fixed gear 113 will travel along that fixed gear, thereby causing the intermediate gears, the shaft 108 and the annular member 111 to rotate in the direction of said travel. The other gear of that pair of intermediate gears travels along the gear 112 and, due to the greater number of teeth in gear 112, causes the latter and its shaft 107 to rotate in the same direction as the shaft 108 and at a different speed, the relative speeds being determined by the difference in the number of teeth in the gears 112 and 113. By providing the gear 112 with less teeth than the gear 113 it may be caused to rotate in the direction opposite the direction of rotation of the shaft 108.

The action of the fluid on the gears tends to exert an end thrust on the gear 112 and means are provided to hydraulically oppose this thrust and maintain hydraulic balance. For this purpose a hydraulic balancing chamber 125 is formed between the gear 112, the annular member 111 and the inner end of the collar 104 and is connected with the high pressure side of the motor so that fluid under pressure is introduced into the balancing chamber 125 to counterbalance the end thrust on the gear 112. The fluid may enter the work chamber through either the passage 120 or the passage 124 and therefore both passages are connected with the balancing chamber and means are provided for preventing the flow of fluid through the balancing chamber to the low pressure passage. In the arrangement here shown (Fig. 2) the passage 120 is connected by a port 126 in the member 110 with an annular channel 127 in the inner face of the gear 112, and a port 128 in the gear connects the channel with the chamber 125. The flow of fluid through the port 126 is controlled by a check valve 129 which opens toward the chamber 125. The passage 124 is connected with the chamber 125 by a port 130 in the annular member 111 and the flow of fluid through this port is controlled by a check valve 131 which opens toward the chamber 125. With the check valves in the positions shown the chamber 125 is connected with the passage 124 and is disconnected from the passage 120. Thus when the motor is in operation the balancing chamber is in open connection with the high pressure side only of the motor and the pressure of the fluid in the chamber substantially counterbalances the end thrust on the gear 112.

While I have shown and described certain embodiments of my invention I wish it to be understood that I do not desire to be limited to the details thereof as various modifications may occur to a person skilled in the art.

Having now fully described my invention, what I claim as new and desire to secure by Letters Patent is:

1. In a fluid displacement device of the gear type, a casing, a shaft rotatably supported in said casing, two gears mounted in said casing concentric with the axis of said shaft, one of said gears being rotatable and the other of said gears being held against rotation, a second shaft connected with the rotatable gear, a plurality of planetary gears connected with the first mentioned shaft for rotation therewith and having geared connection with the first mentioned gears, and means for causing fluid to flow in operative engagement with separated groups of teeth on each of said planetary gears.

2. In a fluid displacement device of the gear type, a casing, a shaft rotatably mounted in said casing, a bevel gear mounted in said casing about the axis of said shaft and held against rotation, a second bevel gear mounted in said casing for rotation about the axis of said shaft and with relation to said shaft, a second shaft connected with said rotatable gear, a plurality of pairs of planetary gears connected with the first mentioned shaft for rotation therewith and spaced about the same, the gears of each pair meshing one with the other and with the respective bevel gears, and means for causing fluid to flow in operative contact with separated groups of teeth on each planetary gear and in directions to cause the gears of each pair to rotate in opposite directions about their respective axes.

3. In a fluid displacement device of the gear type, a casing, a shaft rotatably supported in said casing, a structure mounted in said casing about and in spaced relation to said shaft and connected with said shaft for rotation therewith, a bevel gear supported in said casing for rotation about the axis of said shaft, a second bevel gear mounted in said casing about the axis of said shaft and held against rotation, a plurality of planetary gears supported between said shaft and said structure for rotation therewith and having geared connection with the first mentioned gears, a shaft connected with the rotatable first mentioned gear, and means for causing fluid to flow in operative contact with separated groups of teeth of each of said planetary gears.

4. In a fluid displacement device of the gear type, a casing, a shaft rotatably supported in said casing, a structure mounted in said casing about and in spaced relation to said shaft for rotation about the axis of said shaft, a plurality of groups of pintles extending through the space between said shaft and said structure, said groups of pintles being spaced one from the other about said shaft, bevel gears supported in the space between said shaft and said structure and spaced one from the other, one of said gears being rotatable and the other of said gears being held against rotation, a shaft connected with said rotatable gear, a plurality of groups of gears rotatably mounted on the respective pintles, the gears of each group having geared connection one with the other and with the first mentioned gears, and means for causing fluid to flow in operative contact with separated sections of the toothed edge of each of the last mentioned gears.

5. In a fluid displacement device of the gear type, a casing, a shaft rotatably supported in said casing, a structure mounted in said casing about and in spaced relation to said shaft, said structure and said shaft having opposed surfaces and forming substantially sections of spheres having a common center at the axis of said shaft, a plurality of pairs of pintles between said opposed surfaces, each pintle having its ends mounted respectively in said structure and said shaft and connecting the same for rotation in unison, axially spaced bevel gears supported about the axis of said shaft between the latter and said structure, one of said gears being rotatable about said axis and the other of said gears being held against rotation, one of said gears having more teeth than the other gear, a shaft connected with said rotatable gear, a plurality of pairs of planetary gears rotatably supported by the respective pintles, said pairs of gears being spaced about the first mentioned shaft, and the gears of each pair meshing one with the other and with the respective first mentioned gears, means in the space between said shaft and said structure forming channels about separated peripheral portions of each of said planetary gears, and means for delivering fluid to and discharging the same from each of said channels.

6. In a fluid displacement device of the gear type, a casing having a work chamber within the same, a shaft rotatably supported in said casing, two gears mounted in said work chamber concentric with the axis of said shaft, one of said gears being rotatable and the other of said gears being held against rotation, a second shaft connected with said rotatable gear, intermeshing planetary gears connected with the first mentioned shaft for rotation therewith and having geared connection with the first mentioned gears, inlet and outlet passages leading to and from said work chamber, a balancing chamber between said rotatable gear and a fixed part of said work chamber, and means for connecting said balancing chamber with said inlet passage to provide fluid pressure thereon to counteract the end thrust on said rotatable gear.

7. In a fluid displacement device of the gear type, a casing having a work chamber within the same, a shaft rotatably supported in said casing, two gears mounted in said work chamber concentric with the axis of said shaft, one of said gears being rotatable and the other of said gears being held against rotation, a second shaft connected with said rotatable gear, intermeshing planetary gears connected with the first mentioned shaft for rotation therewith and having geared connection with the first mentioned gears, two fluid passages connected with said work chamber either of which may be the inlet passage, a balancing chamber between said rotatable gear and a fixed part of said work chamber, ports leading from the respective passages to said chamber, and check valves in the respective ports to connect the inlet passage with said work chamber and to disconnect the other passage therefrom, whereby fluid under pressure will be admitted to said chamber to counterbalance end thrust on said rotatable gear.

CECIL A. MANN.

REFERENCES CITED

The following references are of record in the file of this patent:

UNITED STATES PATENTS

| Number | Name | Date |
|---|---|---|
| 1,287,118 | Shore | Dec. 10, 1918 |
| 1,636,259 | Sweeney | July 19, 1927 |
| 1,937,367 | Vickers | Nov. 28, 1933 |
| 2,240,874 | Thomas et al. | May 6, 1941 |
| 2,311,237 | Loveday | Feb. 16, 1943 |
| 2,318,386 | Haines | May 4, 1943 |
| 2,333,885 | Poulter | Nov. 9, 1943 |

FOREIGN PATENTS

| Number | Country | Date |
|---|---|---|
| 155,343 | Germany | Nov. 28, 1904 |
| 592,033 | Germany | Jan. 31, 1934 |
| 669,695 | Germany | Jan. 2, 1939 |